Jan. 5, 1932.   C. W. COY   1,839,836
ANTIFREEZE FEEDER FOR PIPE LINES
Filed Sept. 27, 1929

INVENTOR.
Charles W. Coy.
BY
Geo. P. Kimmel
ATTORNEY.

Patented Jan. 5, 1932

1,839,836

UNITED STATES PATENT OFFICE

CHARLES W. COY, OF ONEONTA, NEW YORK, ASSIGNOR OF ONE-HALF TO ANDREW F. GERMOND, OF ONEONTA, NEW YORK

ANTI-FREEZE FEEDER FOR PIPE LINES

Application filed September 27, 1929. Serial No. 395,645.

This invention relates to an anti-freeze feeder designed primarily for use in connection with underground air lines, but it is to be understood that a feeder in accordance with this invention may be employed in any connection for which it is found applicable, and the invention has for its object to provide, in a manner as hereinafter set forth, a feeder for installation with respect to an air line for feeding into the latter, alcohol or other freezing preventive in a quantity to readily mix with the air to reduce to a minimum the possibility of the freezing up of the line.

A further object of the invention is to provide, in a manner as hereinafter set forth, a feeder for the purpose referred to including means for regulating the feed of the alcohol to the line, and further including means to ascertain if the amount of the alcohol fed is as desired.

A further object of the invention is to provide, in a manner as hereinafter set forth, an alcohol feeder for the purpose referred to including a container for the alcohol and further including means leading from the container to the air line for feeding to the latter a regulatable amount of alcohol, and with the latter, when fed being of such proportions as to readily mix with the air supplied to or forced through the air line.

A further object of the invention is to provide, in a manner as hereinafter set forth, an alcohol feeder for the purpose set forth whereby the alcohol is fed to the line in a drip-like manner, and further including means whereby the feed can be regulated in a manner as desired.

Further objects of the invention are to provide, in a manner as hereinafter set forth, an alcohol feeder for the purpose referred to which is simple in its construction and arrangement, strong, durable, compact, including means whereby alcohol can be supplied for the purpose of thawing out a frozen air line, thoroughly efficient in its use to prevent the freezing of the line after the line has been thawed out or if the line has not been frozen, regulatable, readily installed with respect to the air line, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1:
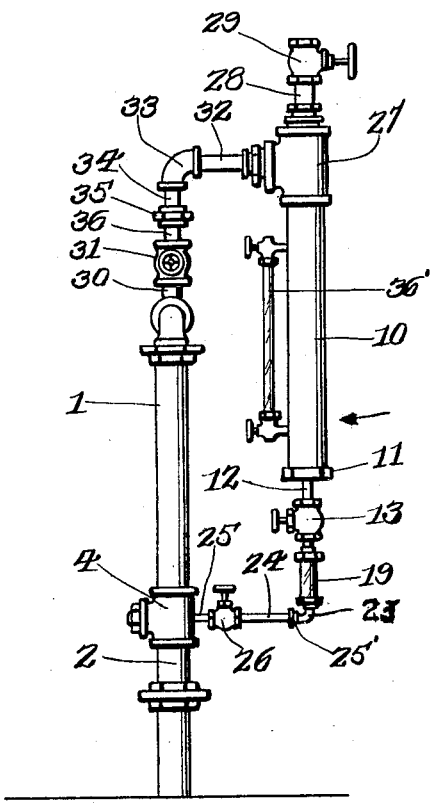
Figure 1 is a front elevation of an alcohol feeder in accordance with this invention showing the adaptation thereof in connection with an air line.
Figure 2:
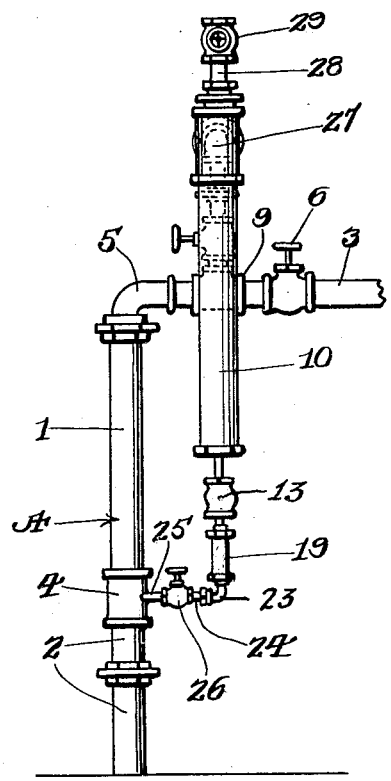
Figure 2 is a side elevation of the device looking in the direction of the arrow, Figure 1.
Figure 3:
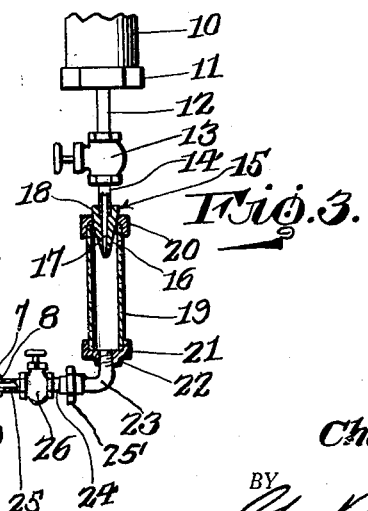
Figure 3 is a fragmentary sectional view, upon an enlarged scale and looking in the direction of the arrow, Figure 1.

As illustrated the air line which is referred to generally at A includes a section 1, a section 2 and a section 3. A coupling union 4 is interposed between sections 1 and 2. An elbow coupling 5 is interposed between sections 1 and 3. A globe valve 6 is interposed in section 3. The union 4 which is in the form of a sleeve is formed with an opening 7 and a peripheral boss 8 surrounding opening 7. Interposed in section 3 is a T-coupling 9. The foregoing elements are illustrated for the purpose of showing the adaptation of a feeder, in accordance with this invention with respect to an air line.

The feeder comprises a container member 10 for receiving the alcohol or other liquid freezing preventative. The container 10 is of cylindrical form and includes a bottom 11 to which is attached a pipe branch 12 of materially reduced diameter with respect to the diameter of the container 10. The branch 12 opens into the housing of a regulating valve 13 and extending from the latter is a pipe branch 14 which is secured to and opens into a dropper 15 consisting of an inverted, conoidal shaped body 16 formed with an axial bore 17 which gradually decreases in diameter from its upper to its lower end, the latter being the discharge end of the dropper. The upper portion of the body 16 is formed with a recess or pocket 18 having a threaded wall and into the pocket 18 extends the pipe branch 14 and the latter threadedly engages with the wall of the pocket 18 whereby the pipe branch 14 is secured to the dropper 15. The lower end of the pipe branch 14 registers with the upper end of the bore 17.

The dropper 15 extends into the upper end of a tubular sight glass 19 of appropriate length and which has mounted on and secured to its upper end an annular cap member 20 through which the dropper 15 extends, as well as being secured thereto. The dropper 15 depends a substantial distance in the glass 19 below the cap member 20. The lower end of glass 19 has secured thereto a flanged cap piece 21 formed with an axial opening 22 having a threaded wall and engaging with such wall, as well as depending from the cap piece 21 is an angle-shaped pipe branch 23 which is coupled to a pipe branch 24 as at 25'.

Secured to the threaded wall of the opening 7 and projecting laterally from the union 4 is a pipe branch 25 which opens into a needle valve 26. The pipe branch 24 opens into the needle valve 26. The valve 26 provides means for closing the air line to the glass 19 and also for regulating the passage of alcohol into the air line. The connection between union 4 and tubular sight glass 19 and provided by the elements 23, 24, 25, 25' and 26 is disposed at an inclination with respect to union 4 and sight glass 19.

Secured to the upper end of the container 1 is a T-coupling 27 into which opens a supply pipe 28 carrying a globe valve 29 for the purpose of closing pipe 28 if desired.

Extending from the T-coupling 9 is a pipe section 30 which opens into the housing of a globe valve 31. Leading from the T-coupling 27 is a pipe branch 32 which opens into an elbow 33, the latter communicating with a pipe section 34 which is connected by a union 35 to a pipe section 36, the latter opening into the housing of the regulating valve 31.

Connected to the container 12 and disposed laterally with respect thereto is a gauge 36'. A by-pass is provided by the T-coupling 27 and elements 30 to 36 inclusive for supplying alcohol in a large quantity to the air line for the purpose of thawing it if it has been frozen up. Under normal conditions the alcohol is supplied to the air line in a regulatable amount through the supply means of the feeder and such supply means consists of the elements 12 to 26 inclusive and the union 4.

When the feed of the alcohol is had through the supply means that portion of the device forming the by-pass is closed and when the supply means of the feeder is not employed the valves 13 and 26 are closed. The glass 19 provides means whereby one can ascertain if the alcohol is dropping in the desired manner from the dropper 15. If too slow the feed will be increased, and if too rapid feed will be decreased. The regulation of the feed from the dropper 15 can be had through the medium of the valve 13.

When the valve 31 is opened and the valves 13 and 26 open the alcohol is forced in the air line due to the induced current created by the passage of the air through the line, and the alcohol when supplied is in such minute quantity as to readily mix with the air, and under such conditions reduce the possibility of the freezing up of the air line to a minimum.

The gauge 36' is for the purpose of determining the amount of alcohol within the container 10.

It is thought the many advantages of an alcohol feeder, in accordance with this invention and for the purpose set forth can be readily understood, and although the preferred embodiment of the invention is as illustrated and described, yet it is to be understood that changes in the details of construction can be had which will fall within the scope of the invention as claimed.

What I claim is:

1. In an anti-freeze preventive feeder for compressed air lines, the combination of a pair of communicating sections of the air line disposed at right angles to each other, one of said sections being valve controlled, a container, a T-coupling having one of its legs attached to and opening into the top of the container and another of its legs adapted to be connected to a preventive supply line, a conduit leading from the other leg of the coupling and opening into said valve controlled section at a point between the valve of the latter and the other of said sections, a cut-off interposed in said conduit a preventive discharge line leading from the bottom of said container and opening into the other of said sections of the air line, said discharge line including a pair of spaced regulating valves, a dropper and a sight glass having the dropper depending therein, said dropper and sight glass arranged between said regulating valves.

2. In an anti-freeze preventive feeder for compressed air lines, the combination of a pair of communicating sections of the air line disposed at right angles to each other, one of said sections being valve controlled, a container, a T-coupling having one of its legs attached to and opening into the top of the container and another of its legs adapted to be connected to a preventive supply line, a conduit leading from the other leg of the coupling and opening into said valve controlled section at a point between the valve of the latter and the other of said sections, a cut-off interposed in said conduit, a preventive discharge line leading from the bottom of said container and opening into the other of said sections of the air line, said discharge line including a pair of spaced regulating valves, a dropper and a sight glass having the dropper depending therein, said dropper and sight glass arranged between said regulating valves, and a gauge glass connected to the container.

3. An anti-freeze preventive feeder for compressed air lines comprising, a vertically disposed imperforate tubular element, a T-coupling having one of its legs attached to the top of said element and another of its legs adapted to be connected to a preventive supply line, a valve controlled conducting means for communication with the air line and attached to the other leg of the coupling, a regulated preventive discharge line for communication with the air line at a point remote from the point of communication of the conducting means with the air line and including a dropper a sight glass and a bottom of said element, said bottom coupling the intake end of the discharge line to said element.

In testimony whereof, I affix my signature hereto.

CHARLES W. COY.